United States Patent [19]

Murphy

[11] 3,964,427
[45] June 22, 1976

[54] SURVIVAL APPARATUS
[75] Inventor: Norma M. Murphy, Kirkland lake, Canada
[73] Assignee: Lawrence Peska Associates, Inc., New York, N.Y. ; a part interest
[22] Filed: Nov. 18, 1974
[21] Appl. No.: 524,468

[52] U.S. Cl. .................... 116/124 B; 116/DIG. 9
[51] Int. Cl.² ........................................... G08B 5/00
[58] Field of Search ...... 116/124 B, DIG. 9, DIG. 8, 116/124 R; 33/129; 343/706; 9/9

[56] References Cited
UNITED STATES PATENTS
3,002,490  10/1961  Murray .................. 116/DIG. 9
3,136,066  6/1964   Spinn .................... 33/129

Primary Examiner—S. Clement Swisher
Assistant Examiner—Denis E. Corr
Attorney, Agent, or Firm—Jack D. Slobod

[57] ABSTRACT

Apparatus for marking a location which includes a balloon and a bottle of pressurized helium which is selectively connected to the balloon which is in turn secured by a cord which is fed through an indicator as it is released to show the amount of cord that has been released and thereby the height of the balloon.

3 Claims, 3 Drawing Figures

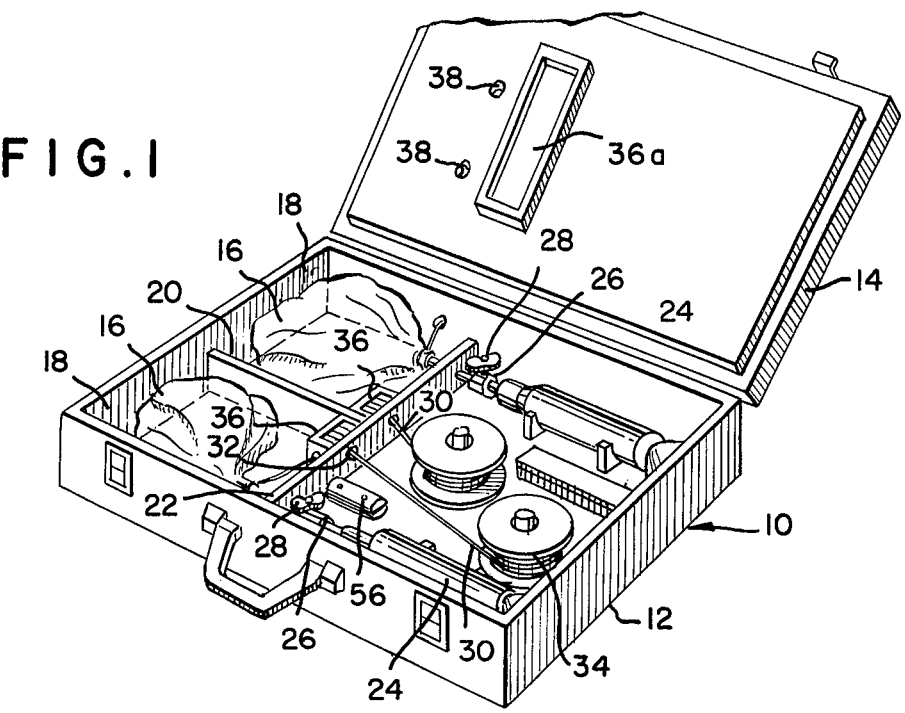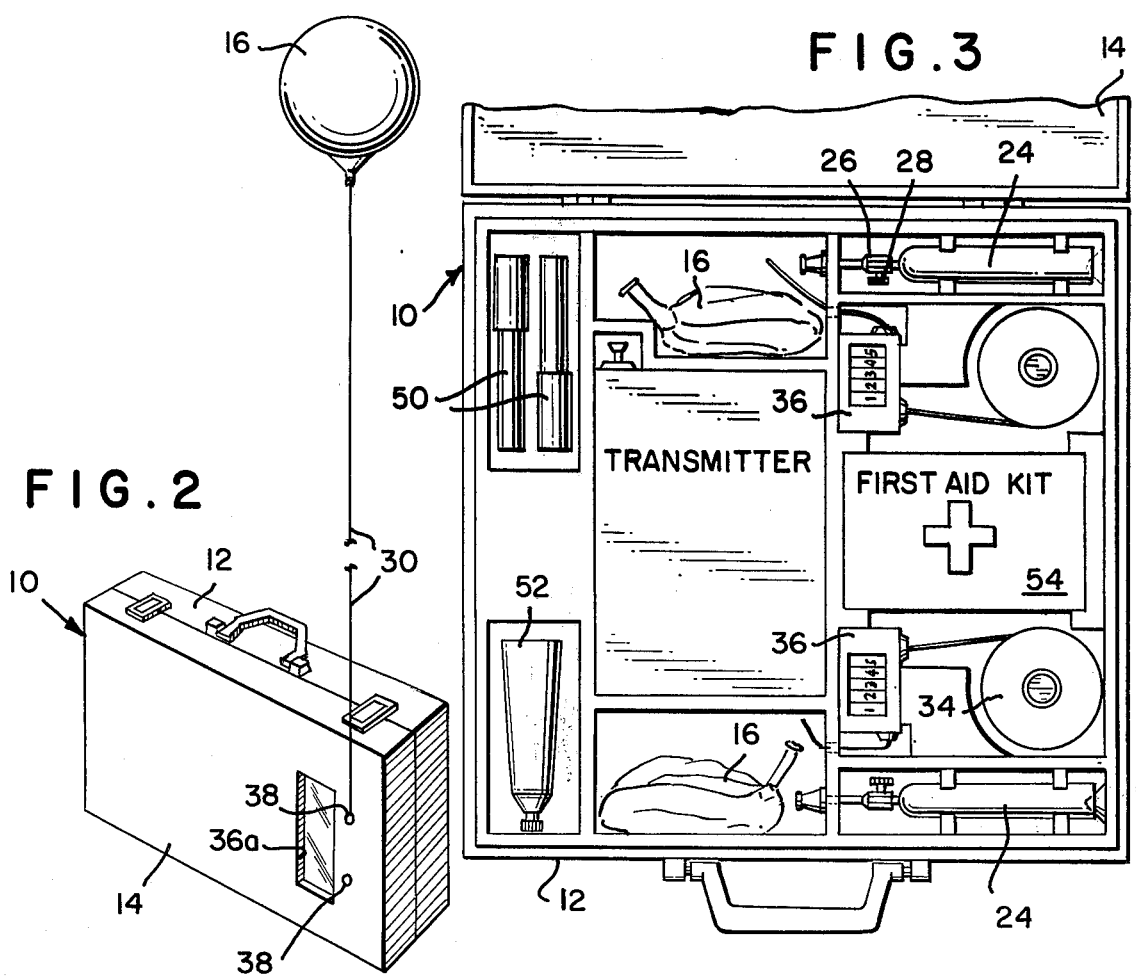

SURVIVAL APPARATUS

BACKGROUND OF THE INVENTION

The field of the invention relates to survival gear and particularly to that for marking a location such as the site where an individual is located. The prior art includes apparatus such as that shown in McPherson, et al., U.S. Pat. No. 2,923,917 issued Feb. 10, 1960. The apparatus therein has not been widely accepted because such apparatus is not particularly suited for being carried by small parties or in small aircraft. The further problem with such apparatus is that it is difficult to control the height to which the balloon is to be positioned.

Accordingly, it is the object of the invention to provide apparatus which is light and easy to move.

Still another object of the invention is to provide apparatus which facilitates the easy control of the height to which the marker may be positioned.

SUMMARY OF THE INVENTION

The apparatus in accordance with the invention includes an assembly consisting of a balloon and a bottle for containing pressurized helium and which is selectively includes communication with the interior of the balloon. Means are provided for securing the balloon which includes a cord secured at one end of the balloon. Separate means are provided for storing the cord which in one form may be a reel. Additional means are provided for measuring the cord removed from the storage means which in one form may be a digital indicator through which the cord passes.

In a preferred form the apparatus will include two of said assemblies and be carried in a housing which is particularly suited for carrying other survival gear.

BRIEF DESCRIPTION OF THE DRAWING

The specification concludes with claims particularly pointing out and distinctly claiming the matter which I regard as my invention. It is believed the invention will be better understood from the following description taken in conjunction with the accompanying drawing which:

FIG. 1 is a perspective view of the apparatus in accordance with the invention;

FIG. 2 is another perspective view of the apparatus shown in FIG. 1; and

FIG. 3 is a plan view of the interior of the apparatus shown in FIG. 1.

DESCRIPTION OF A PREFERRED EMBODIMENT

The apparatus in accordance with the invention is particularly suitable for lost or injured hunters, fishermen, hikers, mountain climbers, prospectors, trappers or even brush pilots or commercial aircraft. Referring now to FIGS. 1 through 3 there is shown a case 10 in accordance with the invention. The case 10 includes a bottom portion 12 and a cover portion 14. In the bottom portion 12 are two balloons 16. Each of the balloons 16 is carried in a separate compartment 18 defined by the divider 20 and guide 22. Pressurized bottles 24 are connected by tubing 26 and valves 28 to the balloons. Connected to the neck of each balloon is a cord 30 which passes through an aperture 32 before being wound on a reel 34 intermediate to guide 22 and the balloon 16 is a digital measuring device 36 which indicates the linear quantity of cord which has passed from the storage means reel 34. A window 36a is disposed adjacent to the balloon 16 so that they may be viewed without opening the top 14. Apertures 38 are disposed adjacent to the window 36a and the balloons may be selectively urged through the apertures and pressurized externally thereafter followed by release. More commonly balloons will be inflated in the position shown in FIG. 1 and the top 14 will be closed after the balloons have reached the desired height. The construction of the container 10 will be such that the cord 30 will not be damaged by closing the top 14 against the bottom 12.

Preferably the apparatus in accordance with the invention will include storage means for accommodating various other survival gear. Included will be waterproof matches 50, water repellent 52, a first aid kit 54, a knife 56. Although not shown it is highly desirable that the apparatus include a ground sheet.

It will be seen that the apparatus so described is compact and provides means for storing the essentials for survival as well as providing a means for signalling searchers. The capability of selectively varying the altitude at which the balloon will be displayed is of particular advantage where the terrain is irregular and it is essential to display the balloon at an interval where it can best be seen. In some situations it is difficult to determine whether the balloon is indeed visible when standing at the base from which the cord extends. The addition of a digital indicator indicating the amount of cord which has been released will aid providing an indication as to the location of a party on the ground. In some situations it may be desirable to allow the balloon to travel to a height of a surrounding high piece of ground such as a mountain. In other cases it may be desirable to control the balloon such that it is allowed to travel to the height at which an airplane might reasonably fly and therefore be more readily observed.

Having thus described my invention what I claim is:

1. Apparatus for marking a physical location which comprises: a case; an assembly within said case comprising a balloon; a bottle containing pressurized helium; valve means coupled to said bottle and configured for accepting a mouth of said balloon for enabling selective inflation of said balloon; a cord secured at one end to said balloon; means in said case for storing said cord; cord measuring means mounted in said case and engaging said cord; said measuring means including a digital indication of the linear quantity of cord removed from said storing means; said case having a transparent area in register with said measuring means for enabling viewing said digital indication through said case.

2. The apparatus of claim 1 wherein said apparatus includes first and second of said assemblies, the transparent area of said case being of a size for viewing measuring means of each of said assemblies.

3. The apparatus of claim 2 wherein said storing means comprises a reel mounted for rotation within said case and wherein said case is configured for storage of other survival gear.

* * * * *